United States Patent [19]

Lewis

[11] Patent Number: 5,631,534
[45] Date of Patent: May 20, 1997

[54] BIDIRECTIONAL CURRENT PUMP FOR BATTERY CHARGE BALANCING

[75] Inventor: Dave Lewis, Torrance, Calif.

[73] Assignee: Delco Electronics Corp., Kokomo, Ind.

[21] Appl. No.: 517,886

[22] Filed: Aug. 21, 1995

[51] Int. Cl.$^6$ .................................................. H01M 10/46
[52] U.S. Cl. ................................ 320/6; 320/15; 320/21
[58] Field of Search .............................. 320/6, 7, 15, 16, 320/17, 18, 14, 21, 30, 43

[56] References Cited

U.S. PATENT DOCUMENTS

| | | | |
|---|---|---|---|
| 4,502,000 | 2/1985 | Mashikian | 320/6 |
| 4,502,001 | 2/1985 | Galloway | 320/6 |
| 4,949,028 | 8/1990 | Brunt | 320/6 |
| 4,967,136 | 10/1990 | Nofzinger | 320/6 |
| 5,498,950 | 3/1996 | Ouwerkerk | 320/18 |

*Primary Examiner*—Edward Tso
*Attorney, Agent, or Firm*—Mark A. Navarre

[57] ABSTRACT

A battery balancing system for balancing charge among series connected batteries. The battery balancing system includes a series connected battery array having a predetermined number of series connected batteries. A predetermined number of bidirectional charge balancing modules are provided and each respective module is coupled across two consecutive batteries. A controller is connected to each of the batteries for sensing the state of charge of each of the batteries and for providing control output signals that turn on and off and control the current direction flow of the modules to balance charge among batteries. Each module includes first and second series connected switches coupled across two consecutive batteries. Each of the series connected switches have control inputs connected to control outputs of the controller. First and second diodes are respectively coupled across the first and second series connected switches. An inductor is coupled from a point between the first and second series connected switches and a point between the batteries.

7 Claims, 3 Drawing Sheets

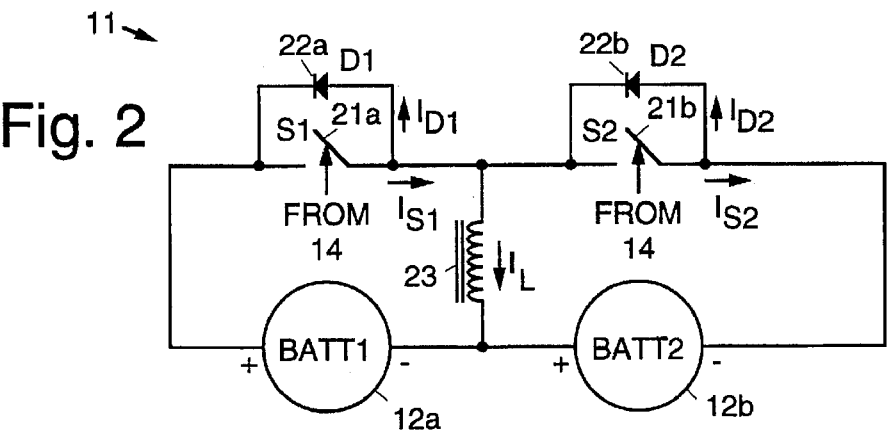
Fig. 2
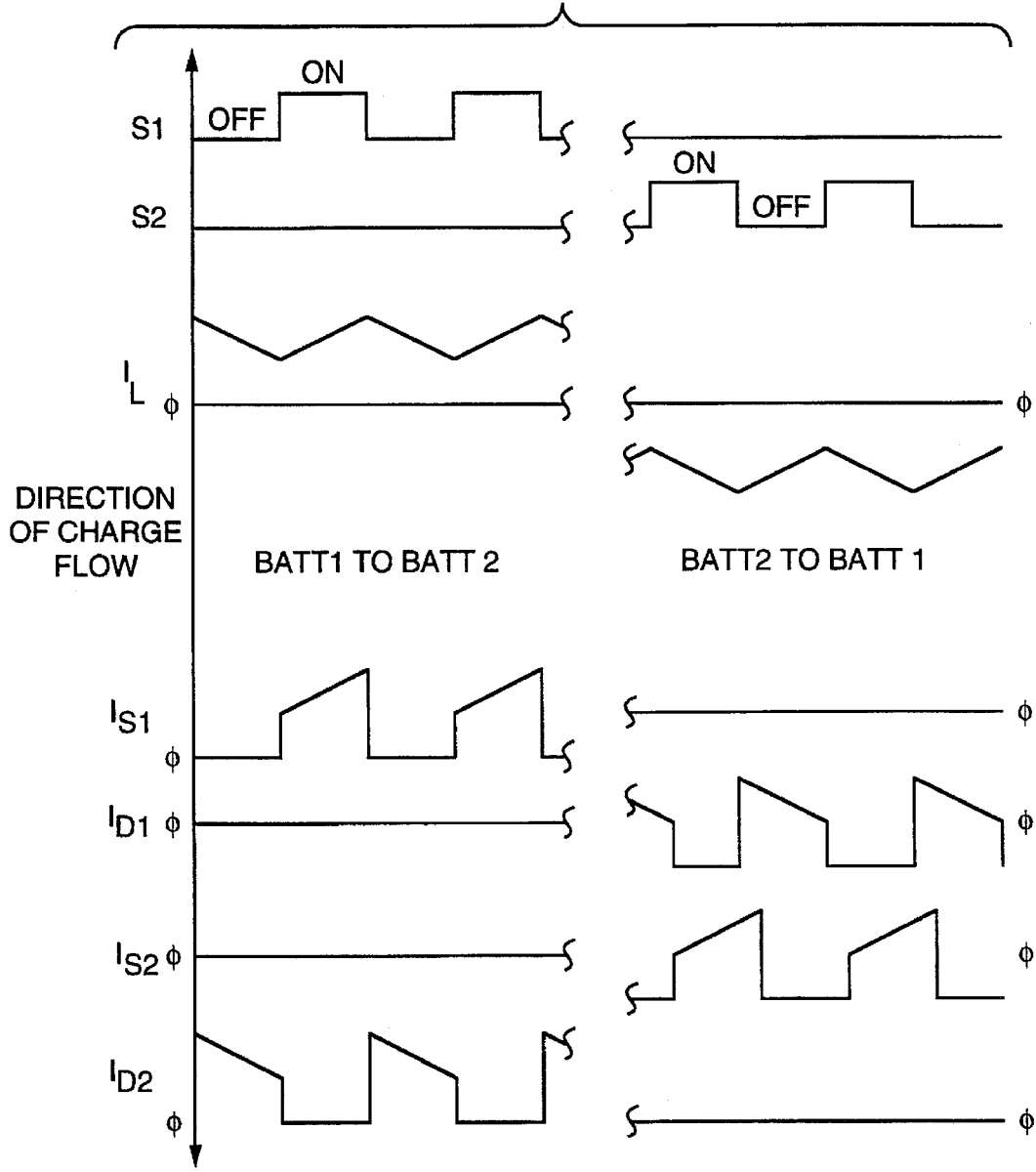

BIDIRECTIONAL CURRENT PUMP FOR BATTERY CHARGE BALANCING

BACKGROUND

The present invention relates generally to series connected battery arrays found in electric vehicles, standby power systems, spacecraft, and the like, and more particularly, to a bidirectional current pump for use in series connected battery arrays that provides for battery charge balancing.

While there is no known prior art specifically relating to the present invention, it is well known that charge balancing is a critical issue for batteries connected in series because the total useful capacity of the battery array is limited by the weakest cell or battery in the array. Therefore, the ability to balance the state of charge for all battery cells in an array improves useful array capacity and life.

Therefore, it is an objective of the present invention to provide for a bidirectional current pump for balancing battery charge in series connected battery arrays.

SUMMARY OF THE INVENTION

In order to meet the above and other objectives, the present invention provides for a battery balancing system that accomplishes charge balancing of a series connected battery array through a novel use of a modular switching circuit. The present invention is a balancing circuit or bidirectional current pump. The present invention balances the state of charge of all batteries and battery cells in the battery array and thus improves useful battery array capacity and life.

More specifically, the present invention is a battery balancing system comprising a series connected battery array having a predetermined number (N) of batteries connected in series. A predetermined number (N-1) of bidirectional charge balancing modules are provided and each respective module is coupled across two consecutive batteries. A controller is connected to each of the batteries for sensing the state of charge of each of the batteries and for providing control output signals that turn on and off selected ones of the bidirectional charge balancing modules to balance charge among batteries.

Each bidirectional charge balancing module is comprised of first and second series connected switches coupled across two consecutive batteries. Each of the series connected switches have control inputs connected to control outputs of the controller. First and second diodes are respectively coupled across the first and second series connected switches. An inductor is coupled from a point between the first and second series connected switches and a point between the batteries.

The present invention provides a low cost and efficient approach for balancing the state of charge of battery cells. Charge from a strong cell or battery is transferred bucket brigade style along the battery array to a weak cell or battery. The balancing circuit or bidirectional current pump allows charge to be transferred in either direction.

The present invention has the following advantages. It provides for highly efficiency charge transfer of (>85%) resulting in low power dissipation. It provides for a modular approach facilitating low cost manufacturing. It may be used with any number of batteries in a series connected array. The present invention also provides for centralized control of the battery array.

While the present invention is specifically designed for use with series connected battery arrays found in electric vehicles, standby power systems, and spacecraft, it also may be used in other applications.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 shows a detailed schematic of a battery balancing module used in the battery balancing system of FIG. 1;

FIG. 3 shows graphs of waveforms found in the battery balancing system of FIG. 2 that illustrates its operation.

DETAILED DESCRIPTION

Figure 1:
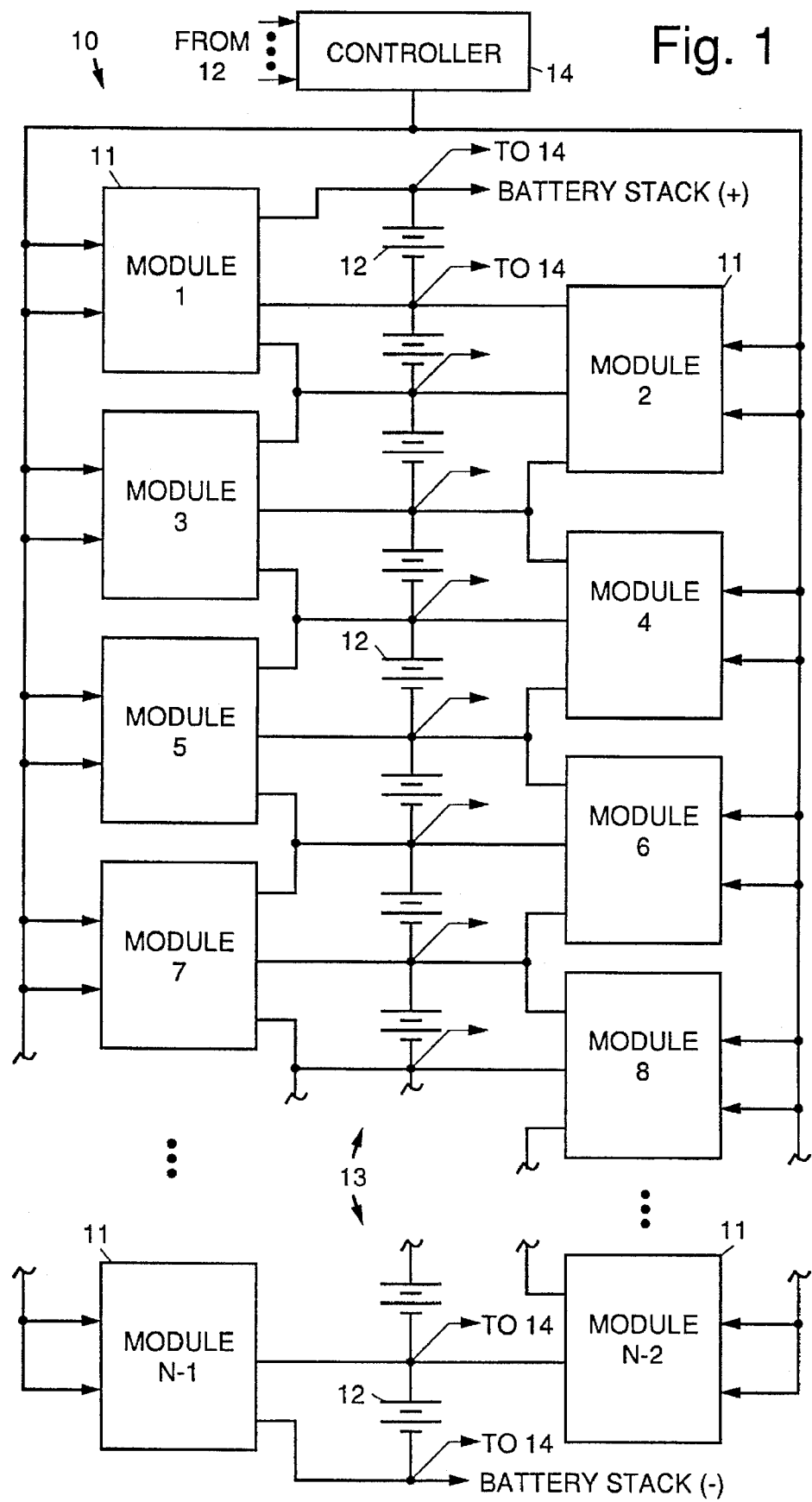
FIG. 1 illustrates a battery balancing system employing a bidirectional current pump in accordance with the principles of the present invention.

Referring to the drawing figures, FIG. 1 shows a detailed schematic block diagram of a battery balancing system 10 employing a plurality of bidirectional current pumps 11, or bidirectional charge balancing modules 11, in accordance with the principles of the present invention. The battery balancing system is adapted for use in balancing charge among batteries 12 of a series connected battery array 13. The battery array 13 (also referred to herein as a battery stack 13 or stack 13) is comprised of a predetermined number (N) of batteries 12 connected in series. The battery balancing system 10 of the invention is also comprised of a predetermined number (N-1) of bidirectional charge balancing modules 11. Each charge balancing module 11 is connected across two consecutive batteries 12 in the stack and is coupled to and controlled by a single central controller 14.

To perform charge balancing, the controller 14 must have knowledge of the relative state of charge of all batteries 12 in the stack 13. The relative state of charge of all batteries 12 in the stack 13 is determined by the controller 14. The controller 14 determines each individual battery 12 state of charge by monitoring individual battery voltages, for example. While this will not provide absolute state of charge information, is does provide for the relative state of charge information necessary to determine and control the balancing of individual batteries 12.

Given knowledge of the state of charge of each of the respective batteries 12, the controller 14 embodies a strategy to transfer energy from individual batteries 12 to effect state of charge balancing. The control 14 implements this strategy by turning on specific charge balancing modules 11 and commands the appropriate charging direction such that charge is removed from stronger batteries 12 and delivered to weaker batteries 12, thereby balancing the state of charge of the battery array 13. The direction of power flow is determined by the relative timing of switches 21a and 21b in the balancing modules 11. FIG. 3 shows waveforms illustrating relative switch timing in relationship to current direction flow.

Referring to FIG. 2, it shows a detailed schematic of a battery balancing module 11 used in the battery balancing system 10 of FIG. 1. The current pump module 11 or bidirectional current pump 11 is comprised of first and second series connected switches 21a, 21b (S1, S2) that are coupled across two consecutive batteries 12a, 12b. First and second diodes 22a, 22b (D1, D2) are coupled across respective ones of the first and second series connected switches 21a, 21b. An inductor 23 (L1) is coupled from a point between the first and second series connected switches 21a, 21b and a point between the batteries 12a, 12b. Each of the series connected switches 21a, 21b have their control inputs (that turn on and off the switches 21a, 21b) connected to control outputs of the controller 14.

The operation of the current pump module 22 is illustrated by the waveforms shown in FIG. 3. To transfer charge from a first battery 12a (BATT1) to a second battery 12b (BATT2), the first switch 21a (S1) is operated (opened and closed) using pulse width modulated (PWM) signals generated by the controller 14 while the second switch 21b (S2) is left open. As is shown in FIG. 3, the current in the inductor 23 (L1) increases when the first switch 21a (S1) is closed, removing charge from the first battery 12a (BATT1). When the first switch 21a (S1) is open, the current in the inductor 23 (L1) decreases and "free-wheels" through the second diode 22b (D2) supplying charge to the second battery 12b (BATT2). Thus the first battery 12a (BATT1) has a net DC current ($I_{S1}$) flowing out of it and supplies charge while the second battery 12b (BATT2) has a net DC current ($I_{D2}$) flowing in and receives charge.

To reverse the direction of charge flow from the second battery 12b (BATT2) to the first battery 12a (BATT1), as can be seen in FIG. 3, the first switch 21a (S1) is held open while the second switch 21b (S2) is operated using the PWM signals provided by the controller 14. The operation is the same as discussed above except that now the second switch 21b (S2) and the first diode 22a (D1) carry the charging current and the current waveform of the inductor 23 (L1) is in the opposite direction.

Figure 4:
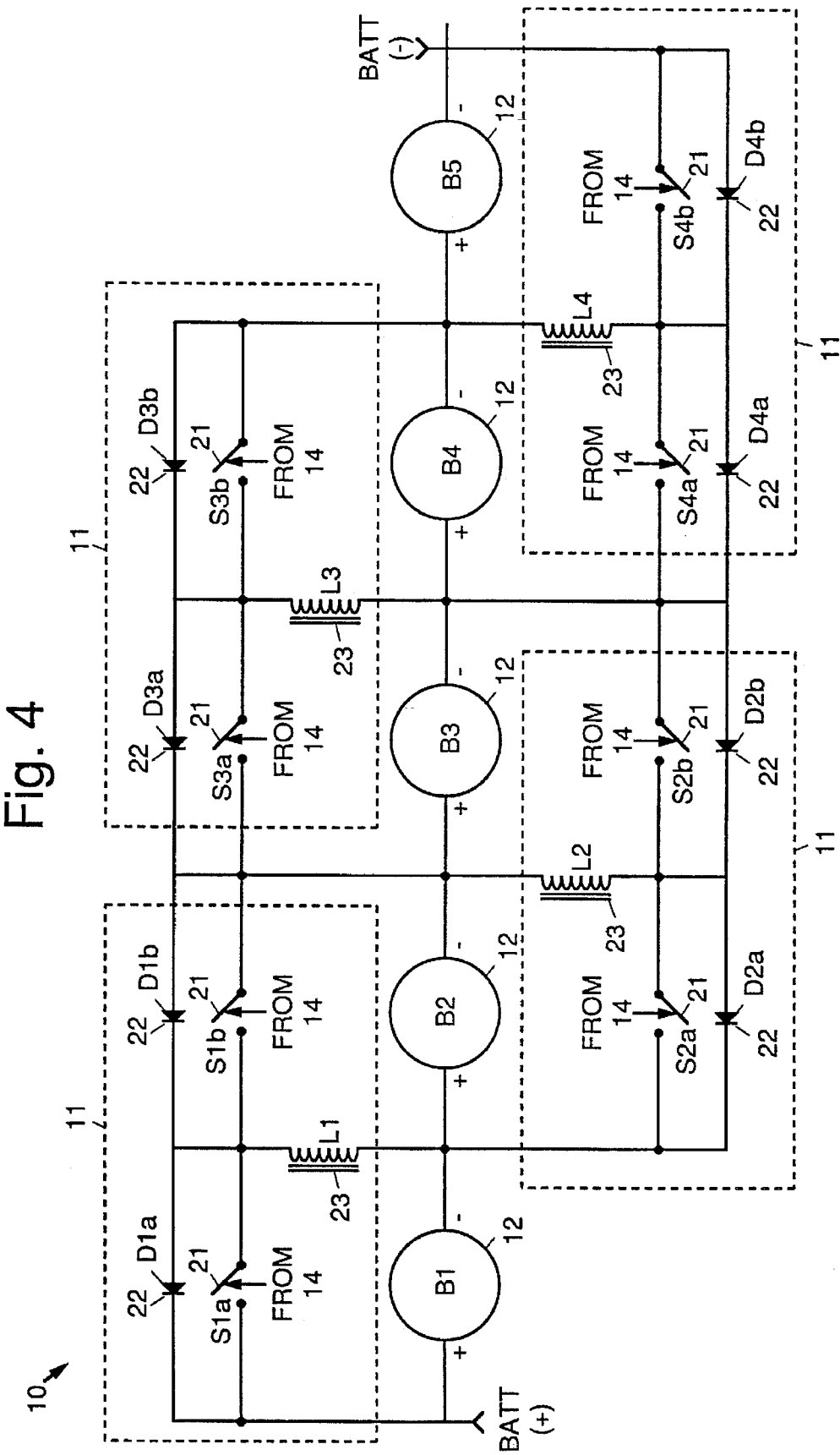
FIG. 4 shows a detailed schematic of a five battery stack illustrating the operation of the present invention.

By way of example, and with reference to FIG. 4, it shows a detailed schematic of a five battery stack 13 (N=5) whose operation will now be described. As can be seen, four (N−1=4) modules 11 are required. Two diodes 22 (D1a, D1b), two switches 21 (S1a, S1b), and one inductor 23 (L1) form each current pump module 11. If, for example, the first battery 12 (B1) is at high state of charge while a fourth battery 12 (B4) is at low state of charge, then the system 10 would be configured so that charge is transferred from the first battery 12 (B1) to the second battery 12 (B2) via the first current pump module 11 (module 1), the second battery 12 (B2) to the third battery 12 (B3) via second current pump module 11 (module 2), and then finally the third battery 12 (B3) to the fourth battery 12 (B4) via the third current pump module 11 (module 3). By controlling which modules 11 are on and off and by selecting their charging directions, charge transfer between any possible combination of batteries 12 in the stack 13 may be realized. Charge transfer can either be bucket brigade style or through simultaneous and synchronized operation of the individual modules 11. The present invention may be applied to battery arrays 13 with virtually any number of batteries 12 or cells in the array and achieve complete flexibility for charge balancing between the batteries 12.

Thus there has been described a new and improved bidirectional current pump for use in coupled inductor conductive battery chargers that provides for battery charge balancing. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A battery balancing system comprising:
   a series connected battery array comprising a predetermined number (N) of batteries connected in series;
   a predetermined number (N−1) of bidirectional charge balancing modules, each charge balancing module being connected across two consecutive batteries for transferring charge from either of the respective two consecutive batteries to the other; and
   a controller connected to each of the bidirectional charge balancing modules for providing control output signals to the bidirectional charge balancing modules to equalize the charge among batteries.

2. A battery balancing system comprising:
   a series connected battery array comprising a predetermined number (N) of batteries connected in series;
   a predetermined number (N−1) of bidirectional charge balancing modules, and wherein each bidirectional charge balancing module comprises first and second series connected switches coupled across two consecutive batteries, each of the series connected switches having control inputs connected to control outputs of the controller, first and second diodes coupled across respective ones of the first and second series connected switches and an inductor coupled from a point between the first and second series connected switches and a point between the two consecutive batteries;
   a controller connected to each of the bidirectional charge balancing modules for providing control output signals that turn on and off and control selected bidirectional charge balancing modules to balance charge among batteries.

3. A battery balancing system comprising:
   a series connected battery array comprising a predetermined number (N) of batteries connected in series;
   a predetermined number (N−1) of bidirectional charge balancing modules, and wherein each charge balancing module is connected across two consecutive batteries; and
   a controller connected to each of the bidirectional charge balancing modules for providing control output signals that turn on and off and control selected bidirectional charge balancing modules to balance charge among batteries, wherein the control output signals provided by the controller comprise pulse width modulated control signals.

4. A charge balancing system for use in balancing charge among series connected batteries, said system comprising:
   a controller coupled to each of the batteries for sensing the relative state of charge thereof; and
   a predetermined number of bidirectional charge balancing modules coupled to the controller that each comprise:
   first and second series connected switches coupled across two consecutive batteries, and wherein each of the series connected switches have control inputs connected to control outputs of the controller;
   first and second diodes coupled across respective ones of the first and second series connected switches; and
   an inductor coupled from a point between the first and second series connected switches and a point between the batteries; and
   wherein the controller turns on and off selected ones of the switches of selected ones of the predetermined number of bidirectional charge balancing modules to transfer charge from relatively high charge batteries to relatively low charge batteries to thereby balance charge among the series connected batteries.

5. The system of claim 4 wherein the control output signals provided by the controller comprise pulse width modulated control signals.

6. A battery balancing module capable of transferring power bidirectionally from one battery to another in response to control signals provided by a controller coupled to each of the batteries that senses the relative state of charge thereof, said module comprising:

first and second series connected switches coupled across two consecutive batteries, and wherein each of the series connected switches have control inputs connected to control outputs of the controller;

first and second diodes coupled across respective ones of the first and second series connected switches; and an inductor coupled from a point between the first and second series connected switches and a point between the batteries.

7. A battery balancing system comprising:

a series connected battery array comprising a predetermined number (N) of batteries connected in series;

a predetermined number (N-1) of bidirectional charge balancing modules, each charge balancing module being connected across two consecutive batteries and having two switching devices and an intermediate charge storage device, the switching devices being adapted to be turned on and off for transferring charge from either of the respective two consecutive batteries to the other; and a controller connected to each of the bidirectional charge balancing modules for providing control output signals that turn on and off the switching devices of selected bidirectional charge balancing modules to balance charge among batteries.

* * * * *